(12) United States Patent
Faaborg et al.

(10) Patent No.: US 8,996,639 B1
(45) Date of Patent: Mar. 31, 2015

(54) PREDICTIVE RESPONSES TO INCOMING COMMUNICATIONS

(71) Applicant: Google Inc., Mountain View, CA (US)

(72) Inventors: Alexander Faaborg, Mountain View, CA (US); Joshua Robin Kaplan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/100,762

(22) Filed: Dec. 9, 2013

Related U.S. Application Data

(60) Provisional application No. 61/891,082, filed on Oct. 15, 2013.

(51) Int. Cl.
*G06F 15/16* (2006.01)
*H04L 12/58* (2006.01)

(52) U.S. Cl.
CPC ..................................... *H04L 51/02* (2013.01)
USPC ..................... 709/206; 455/412.1; 455/412.2; 455/414.1; 455/414.2

(58) Field of Classification Search
CPC . H04L 12/58; H04L 12/5805; H04L 12/5855; H04L 51/02; H04L 51/14
USPC ................. 709/206; 455/412.1, 412.2, 414.1, 455/414.2
See application file for complete search history.

(56) References Cited

U.S. PATENT DOCUMENTS

| | | | |
|---|---|---|---|
| 7,580,719 B2 | 8/2009 | Karmarkar | |
| 8,306,511 B2 | 11/2012 | Ling et al. | |
| 8,385,975 B2 * | 2/2013 | Forutanpour et al. | 455/558 |
| 8,423,577 B1 | 4/2013 | Lee et al. | |
| 8,655,730 B1 * | 2/2014 | Swan et al. | 705/14.69 |
| 2011/0285591 A1 | 11/2011 | Wong | |
| 2012/0245944 A1 | 9/2012 | Gruber et al. | |
| 2013/0328665 A1 * | 12/2013 | Cranfill et al. | 340/7.55 |
| 2014/0089314 A1 * | 3/2014 | Iizuka et al. | 707/740 |

* cited by examiner

*Primary Examiner* — Duyen Doan
(74) *Attorney, Agent, or Firm* — Leydig, Voit & Mayer, Ltd.

(57) ABSTRACT

A computing system includes at least one processor and at least one module, operable by the at least one processor to receive, from a computing device associated with a user, an indication of an incoming communication, the incoming communication including information and determine, based at least in part on the information included in the incoming communication, one or more candidate responses to the incoming communication, wherein each candidate response includes information to be sent by the computing device to at least one other computing device, and wherein at least one candidate response was previously selected at least at a threshold frequency by at least one of the user and one or more other users. The at least one module is further operable by the at least one processor to send, to the computing device, a set of candidate responses from the one or more candidate responses.

20 Claims, 6 Drawing Sheets

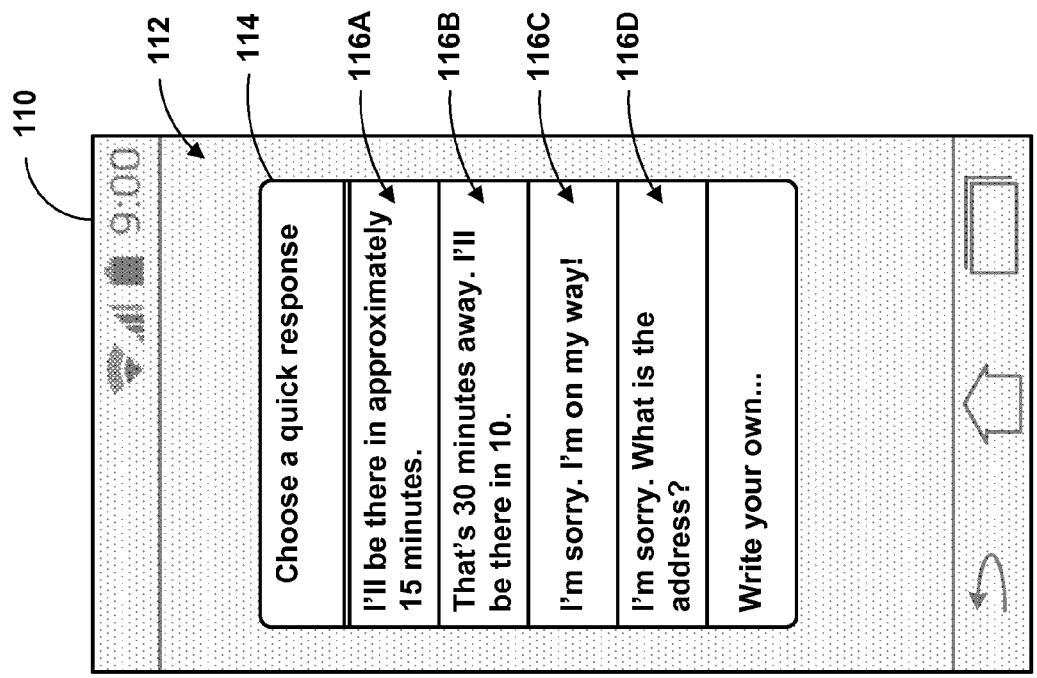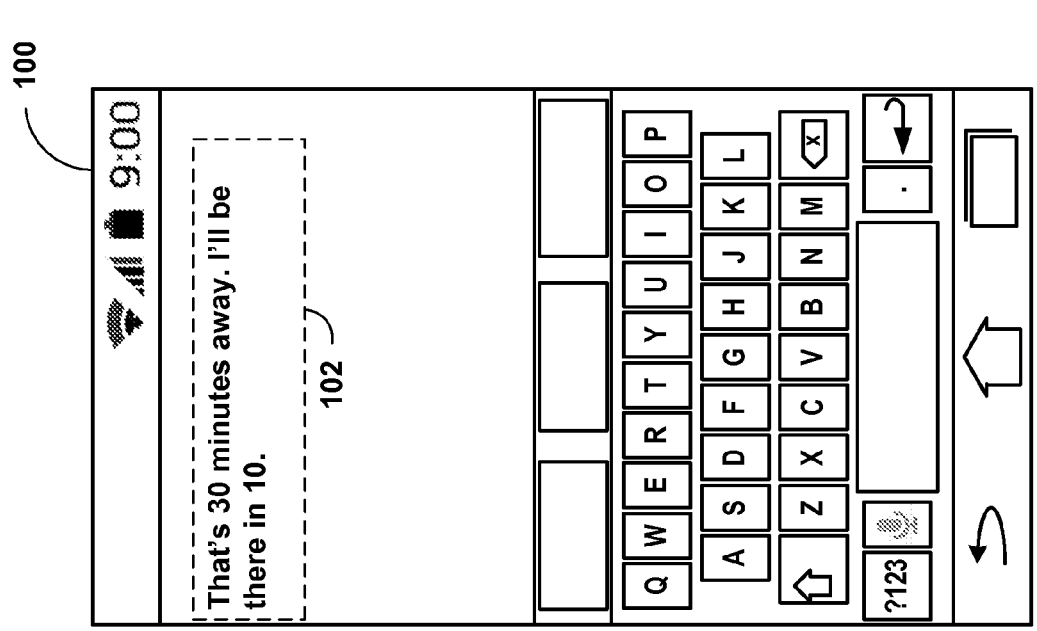

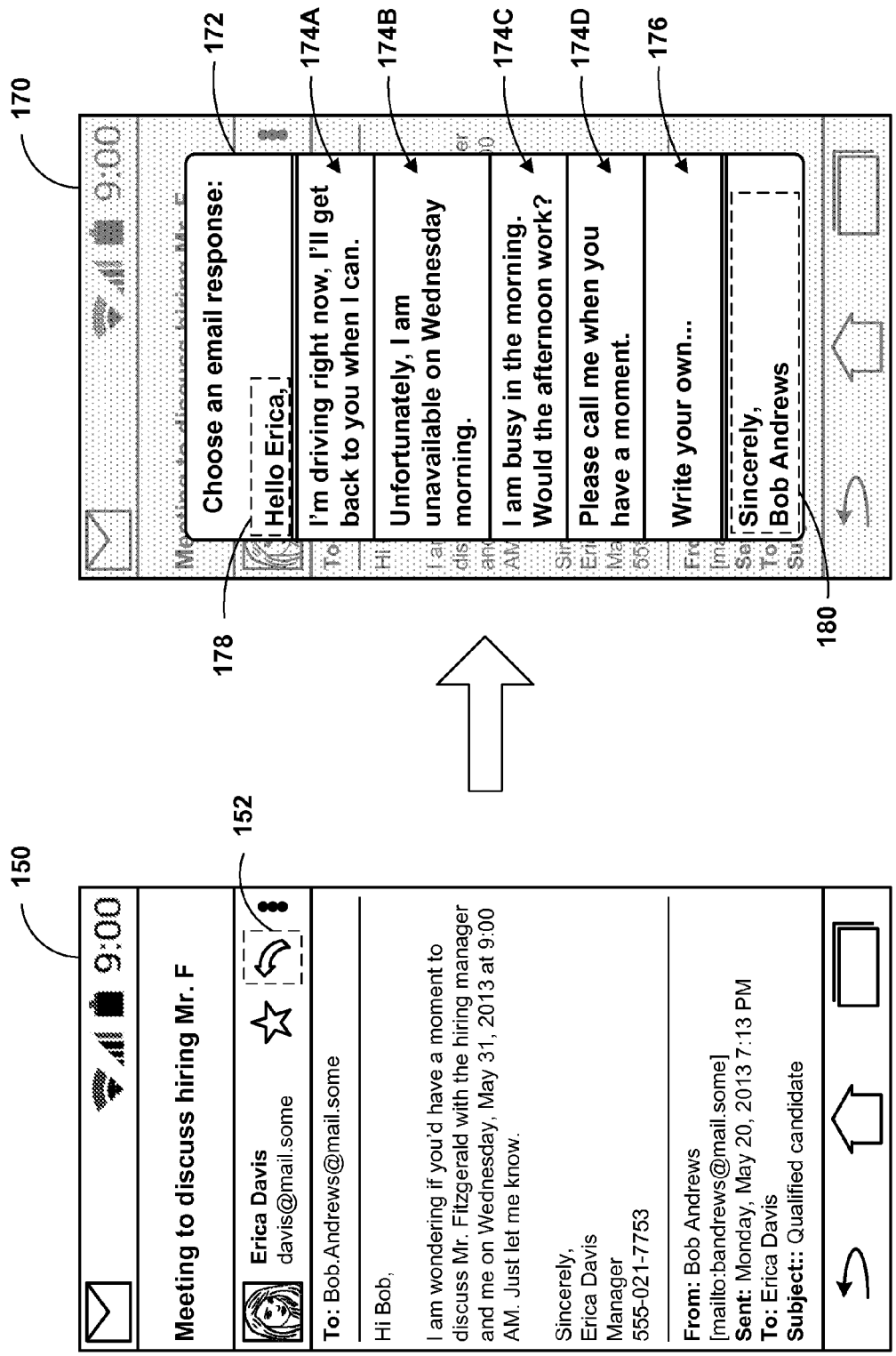

PREDICTIVE RESPONSES TO INCOMING COMMUNICATIONS

This application claims the benefit of U.S. Provisional Application No. 61/891,082, filed Oct. 15, 2013, the entire content of which is incorporated by reference herein.

BACKGROUND

Computing devices (e.g., mobile phones, tablet computers, etc.) may enable a user to respond to incoming communications from one or more other computing devices. In some cases, the incoming communications (e.g., an email, a text message, a meeting request, etc.) may include textual information. A computing device may enable a user of the computing device to respond to the incoming communication by allowing the user to input textual information (e.g., using an input device), and send the textual information to the one or more other computing devices as a response.

Some computing devices may enable a user to choose a response stored by the computing device and send the chosen stored response, such as by providing one or more options that the user may select. For example, responsive to receiving a meeting request, a computing device may enable a user of the computing device to select a response to "accept" the meeting request, "decline" the meeting request, or choose other stored options. However, the computing device may provide only a small number of stored responses, thereby reducing the likelihood that the available stored responses include a response desired by the user. Conversely, the computing device may provide a larger number of stored responses, thereby requiring the user to search through a number of responses, which may not be useful in the current context of the incoming communication.

SUMMARY

In one example, a method includes receiving, by a computing system having at least one processor, from a computing device associated with a user, an indication of an incoming communication, the incoming communication including information and determining, by the computing system, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users. The method further includes sending, by the computing system, to the computing device, a set of candidate responses from the one or more candidate responses.

In another example, a computing system includes at least one processor and at least one module, operable by the at least one processor to receive, from a computing device associated with a user, an indication of an incoming communication, the incoming communication including information and determine, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users. The at least one module is further operable by the at least one processor to send, to the computing device, a set of candidate responses from the one or more candidate responses.

In another example, a computer-readable storage medium is encoded with instructions that, when executed, cause at least one processor of a computing system to receive, from a computing device associated with a user, an indication of an incoming communication, the incoming communication including information and determine, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users. The computer-readable storage medium is further encoded with instructions that, when executed, cause the at least one processor to send, to the computing device, a set of candidate responses from the one or more candidate responses.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A and 3B are conceptual diagrams illustrating example GUIs for providing candidate responses to an incoming communication, in accordance with one or more aspects of the present disclosure.

FIGS. 4A and 4B are conceptual diagrams illustrating example GUIs for providing candidate responses to an incoming communication, in accordance with one or more aspects of the present disclosure.

DETAILED DESCRIPTION

Figure 1:
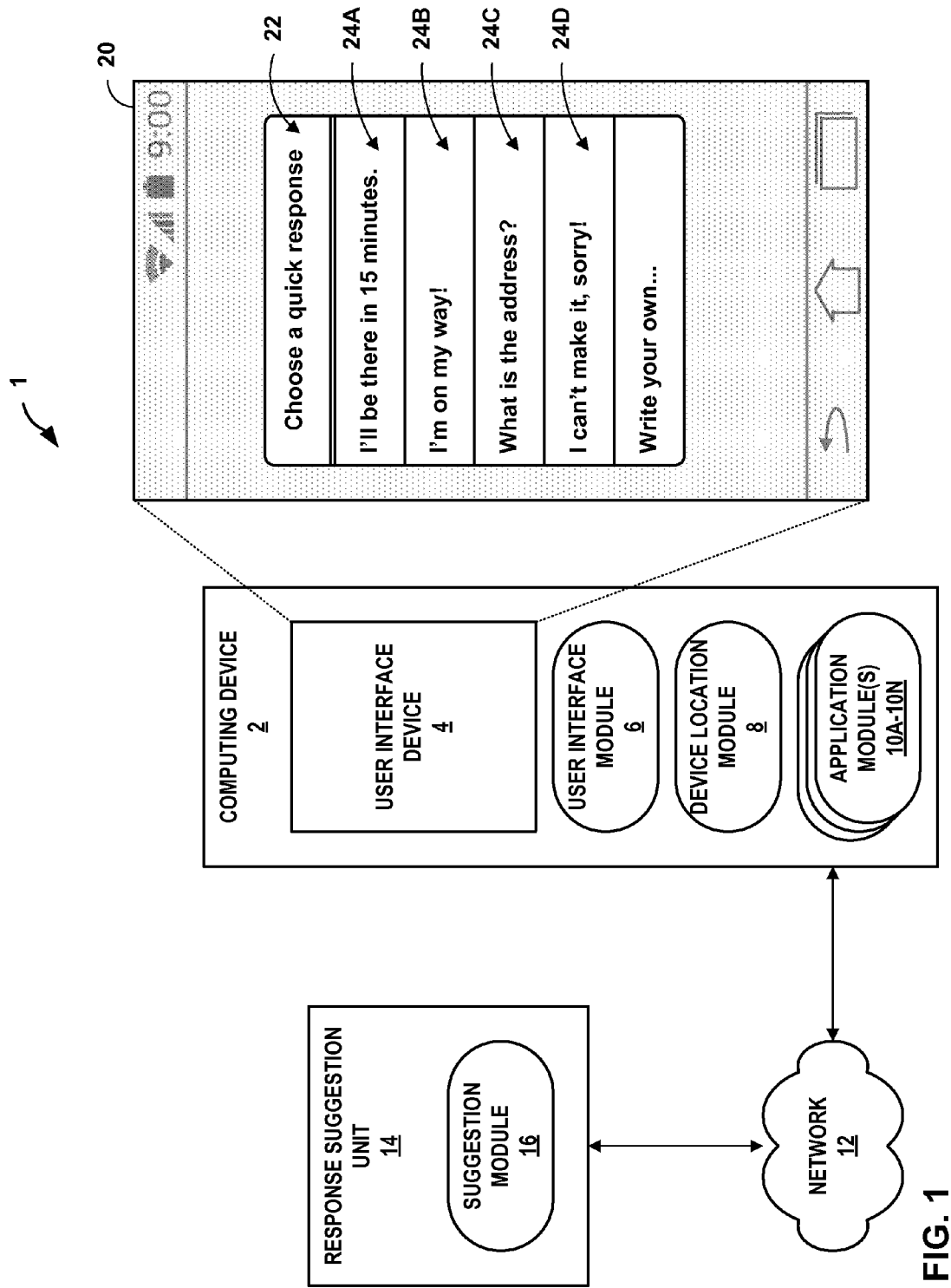
FIG. 1 is a conceptual diagram illustrating an example computing environment and graphical user interface (GUI) for providing candidate responses to an incoming communication, in accordance with one or more aspects of the present disclosure.

In general, techniques of this disclosure may enable a computing system to provide a computing device with candidate responses to incoming communications. The candidate responses may be relevant to the incoming communication and/or to a current situation (e.g., a current context) of a user of the computing device and/or of the computing device. The computing system may determine which candidate responses to send to the computing device based at least in part on the frequency with which users (e.g., the user of the computing device and/or other users) have previously selected the responses to respond to the same or similar incoming communications. For example, a computing system may receive an incoming communication, such as an email, from a computing device associated with a user. The email may include information (e.g., a sender, one or more recipients, title and body text, images, emoji, audio/video data, etc.). The computing system may determine at least one candidate response to the message by analyzing the information, identifying other incoming messages that are similar to the email (e.g., incoming messages that contain at least a portion of the information), and determining at least one response to the other incoming messages that was selected with at least a threshold frequency. The computing system may send the at least one candidate response to the computing device, which may output the at least one candidate response and receive an indication of a selection of one of the candidate responses, thereby enabling the user to select a particular candidate response and send the particular candidate response to one or more other computing devices (e.g., as a response to the email).

In this manner, techniques of the present disclosure may enable a user to send relevant responses to incoming communications without having to manually enter the response. Allowing a user to select from one or more candidate responses may be particularly helpful when it may be difficult or undesirable for the user to manually enter textual information for a response. Techniques of the present disclosure may enable a computing device to increase the user's efficiency by predicting what a user's reply is likely to be, based on a received incoming communication. Accordingly, a computing device configured in accordance with techniques of this disclosure may reduce or remove the need for the user to spend time manually entering information for a response to an incoming communication.

In general, a computing device of a user may send information (e.g., incoming communications, location information, other contextual information, etc.) to the computing system only if the computing device receives permission from the user to send the information. For example, in situations discussed below in which the computing device may collect, transmit, or may make use of personal information about a user (e.g., incoming communications) the user may be provided with an opportunity to control whether programs or features of the computing device can collect user information (e.g., information about a user's communications, a user's social network, a user's social actions or activities, a user's profession, a user's preferences, or a user's current location), or to control whether and/or how the computing device may store and share user information.

In addition, certain data may be treated in one or more ways before it is stored, transmitted, or used by the computing device so that personally identifiable information is removed. For example, a user's identity may be treated so that no personally identifiable information can be determined about the user, or a user's geographic location may be generalized where location information is obtained (such as to a city, ZIP code, or state level), so that a particular location of the user cannot be determined. Thus, the user may have control over how information is collected about the user and stored, transmitted, and/or used by the computing device.

FIG. 1 is a conceptual diagram illustrating an example computing environment 1 and GUI 20 for providing candidate responses to an incoming communication, in accordance with one or more aspects of the present disclosure. As shown in the example of FIG. 1, computing environment 1 includes computing device 2, network 12, and response suggestion unit 14. Examples of computing device 2 may include, but are not limited to, portable, mobile, or other devices, such as mobile phones (including smartphones), laptop computers, desktop computers, tablet computers, smart television platforms, personal digital assistants (PDAs), server computers, mainframes, and the like. For instance, in the example of FIG. 1, computing device 2 may be a smartphone.

Computing device 2, as shown in the example of FIG. 1, includes user interface (UI) device 4. UI device 4 of computing device 2 may be configured to function as an input device and/or an output device for computing device 2. UI device 4 may be implemented using various technologies. For instance, UI device 4 may be configured to receive input from a user through tactile, audio, and/or video feedback. Examples of input devices include a presence-sensitive display, a presence-sensitive or touch-sensitive input device, a mouse, a keyboard, a voice responsive system, video camera, microphone or any other type of device for detecting a command from a user. In some examples, a presence-sensitive display includes a touch-sensitive or presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, or another presence-sensitive technology. That is, UI device 4 of computing device 2 may include a presence-sensitive device that may receive tactile input from a user of computing device 2. UI device 4 may receive indications of the tactile input by detecting one or more gestures from the user (e.g., when the user touches or points to one or more locations of UI device 4 with a finger or a stylus pen).

UI device 4 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, organic light-emitting diode (OLED) display, e-ink, or similar monochrome or color display capable of outputting visible information to a user of computing device 2. Additional examples of an output device include a speaker, a cathode ray tube (CRT) monitor, a liquid crystal display (LCD), or other device that can generate intelligible output to a user. For instance, UI device 4 may present output to a user of computing device 2 as a graphical user interface that may be associated with functionality provided by computing device 2. In this way, UI device 4 may present various user interfaces of applications executing at or accessible by computing device 2 (e.g., an electronic message application, an Internet browser application, etc.). A user of computing device 2 may interact with a respective user interface of an application to cause computing device 2 to perform operations relating to a function.

In some examples, UI device 4 of computing device 2 may detect two-dimensional and/or three-dimensional gestures as input from a user of computing device 2. For instance, a sensor of UI device 4 may detect the user's movement (e.g., moving a hand, an arm, a pen, a stylus, etc.) within a threshold distance of the sensor of UI device 4. UI device 4 may determine a two or three dimensional vector representation of the movement and correlate the vector representation to a gesture input (e.g., a hand-wave, a pinch, a clap, a pen stroke, etc.) that has multiple dimensions. In other words, UI device 4 may, in some examples, detect a multi-dimension gesture without requiring the user to gesture at or near a screen or surface at which UI device 4 outputs information for display. Instead, UI device 4 may detect a multi-dimensional gesture performed at or near a sensor which may or may not be located near the screen or surface at which UI device 4 outputs information for display.

In the example of FIG. 1, computing device 2 includes user interface (UI) module 6, device location module 8, and application modules 10A-10N (collectively "application modules 10"). Modules 6, 8, and/or 10 may perform operations described herein using hardware, software, firmware, or a mixture thereof residing in and/or executing at computing device 2. Computing device 2 may execute modules 6, 8, and/or 10 with one processor or with multiple processors. In some examples, computing device 2 may execute modules 6, 8, and/or 10 as a virtual machine executing on underlying hardware. Modules 6, 8, and/or 10 may execute as one or more services of an operating system or computing platform or may execute as one or more executable programs at an application layer of a computing platform.

UI module 6, as shown in the example of FIG. 1, may be operable by computing device 2 to perform one or more functions, such as receive input and send indications of such input to other components associated with computing device 2, such as application modules 10. UI module 6 may also receive data from components associated with computing device 2 such as device location module 8 or application modules 10. Using the data received, UI module 6 may cause other components associated with computing device 2, such as UI device 4, to provide output based on the data. For instance, UI module 6 may receive data from one of application modules 10 to display a GUI.

In the example of FIG. 1, device location module 8 may be operable to determine a current location of computing device 2 and a current time. For example, computing device 2 may receive signal data from one or more radios of computing device 2 (e.g., global positioning system (GPS) radio, cellular radio, Wi-Fi radio, and the like) and, based on the signal data, determine the current time and the current location of computing device 2. In some examples, device location module 8 may determine a relative location and/or determine a current location based on signal triangulation (e.g., a technique for determining a single location based on relative position data received from two or more signals). In some examples, device location module 8 may determine location data as coordinate (e.g., GPS) location data. In other examples, device location module 8 may determine a location as one or more general or relative locations, such as an address, a place, a country, a city, a type of building (e.g., a library, an airport, etc.), a business, etc.

In some examples, device location module 8 may obtain the current location of computing device 2 and/or the current time from one or more other devices (e.g., via network 12). For instance, in response to sending a Wi-Fi network identifier, device location module 8 may receive GPS coordinates. Device location module 8 may output location and time data to other modules of computing device 2 such as one or more of applications 10.

Application modules 10, as shown in the example of FIG. 1, may include functionality to perform any variety of operations on computing device 2. For instance, application modules 10 may include a word processor, an email application, a web browser, a multimedia player, a calendar application, an operating system, a distributed computing application, a graphic design application, a video editing application, a web development application, or any other application. One of application modules 10 (e.g., application module 10A) may be a text messaging or Short Message Service (SMS) application. Application module 10A may include functionality to compose outgoing text message communications, receive incoming text message communications, respond to incoming text message communications, and other functions. Application module 10A, in various examples, may provide data to UI module 6 causing UI device 4 to display a GUI.

In some examples, one or more of application modules 10 may be operable to receive incoming communications from other devices (e.g., via network 12). For instance, one or more of application modules 10 may receive email messages for an account associated with a user of computing device 2, calendar alerts or meeting requests for a user of computing device 2, or other incoming communications.

Incoming communications may include information (e.g., generated in response to input by users of the other devices). Examples of information include text (e.g., any combination of letters, words, numbers, punctuation, etc.), emoji, images, video, audio, or any other content that may be included in an incoming communication. In the example of FIG. 1, application module 10A may receive an incoming communication (e.g., a text message) from another computing device (not shown). The received text message may include the information "Are you coming to the pub?"

In some examples, UI device 4 may detect input corresponding to a user's selection of an option to respond to an incoming communication. UI module 6 may receive an indication of the input and provide data to one or more of application modules 10 based on the indication. In some examples, responsive to receiving the data, the receiving one of applications 10 may generate a request for candidate responses to the incoming communication. For instance, in the example of FIG. 1, application 10A may generate a request for candidate responses to the text message. The request may include an indication of at least part of the information included in the text message. In some examples, the request may include other information, such as location information, user information, or other information about computing device 2 or a user of computing device 2. Application 10A may only generate the request and/or obtain personal data (e.g., information included in the text message and/or other information) if the user of computing device 2 provides explicit permission. After receiving the explicit permission, computing device 2 may transmit the request via network 12 (e.g., to response suggestion unit 14).

Network 12 represents any public or private communication network, such as a cellular network, Wi-Fi network, or other type of network for transmitting data between computing devices. In some examples, network 12 may represent one or more packet switched networks, such as the Internet. Computing device 2 and response suggestion unit 14 may send and receive data across network 12 using any suitable communication techniques. For example, computing device 2 and response suggestion unit 14 may each be operatively coupled to network 12 using respective network links. Network 12 may include network hubs, network switches, network routers, etc., that are operatively inter-coupled thereby providing for the exchange of information between computing device 2 and response suggestion unit 14. In some examples, network links of network 12 may be Ethernet, ATM or other network connections. Such connections may include wireless and/or wired connections. Network 12 may receive the request from computing device 2 and provide the request to response suggestion unit 14.

Response suggestion unit 14 may represent any suitable remote computing system, such as one or more desktop computers, laptop computers, mainframes, servers, cloud computing systems, etc. capable of sending and receiving information via network 12. In some examples, response suggestion unit 14 may represent a cloud computing system that provides one or more services via network 12. That is, in some examples, response suggestion unit 14 may be a distributed computing system. One or more computing devices, such as computing device 2, may access the services provided by the cloud by communicating with response suggestion unit 14. While described herein as being performed at least in part by response suggestion unit 14, any or all techniques of the present disclosure may be performed by one or more other devices, such as computing device 2. That is, in some examples, computing device 2 may be operable to perform one or more techniques of the present disclosure alone.

In the example of FIG. 1, response suggestion unit 14 includes suggestion module 16. Suggestion module 16 may be operable to determine at least one candidate response to an incoming communication, based at least in part on information included in the incoming communication. Each candidate response may be a predicted message that a user may choose to send in response to an incoming communication. For instance, in the example of FIG. 1, each candidate response determined by response suggestion module 16 may be a prediction of a message that the user of computing device 2 may send in order to respond to the text message, "Are you coming to the pub?"

Suggestion module 16 may determine candidate responses from responses previously selected by one or more users (e.g., the user of computing device 2 and/or other users). That is, response suggestion unit 14 may receive information from various sources (e.g., computing device 2 and/or computing devices associated with other users) indicating incoming communications and the responses that users have selected as responses to the incoming communications. By analyzing the incoming communications and the corresponding selected responses (e.g., chat logs), suggestion module 16 (or other components of response suggestion unit 14) may determine likely replies to common messages. For instance, suggestion module 16 may receive a request including the information, "Are you coming?" Suggestion module 16 may determine that the most common replies to the information included in the request are "I'll be right there," "yes," and "no." In some examples, the information included in the incoming communication and/or the candidate responses need not be proper language. For instance, suggestion module 16 may receive a request to determine candidate responses for the text, "<3" (e.g., a heart emoticon). Suggestion module 16 may determine that the most common responses are "<3", and ":)" (e.g., a smiley emoticon). In some examples, candidate responses may be responses that have been selected at least at a threshold frequency by the one or more users. In other examples, candidate responses may be based additionally or instead on manual review by developers or administrators of response suggestion unit 14. Manual review may be beneficial, for example, to ensure candidate responses are appropriate.

In some examples, suggestion module 16 may determine candidate responses based at least in part on a current context of a computing device that sent the request. Suggestion module 16 (or other components of response suggestion unit 14) may determine a current context of a computing device (e.g., computing device 2) based on information included in a request for candidate responses and/or obtained from other sources. For instance, suggestion module 16 may receive a request from computing device 2 that includes an indication of a particular incoming communication as well as location information about computing device 2. Suggestion module 16 may provide candidate responses based on the indication of the particular incoming communication as well as on the location information. In another example, suggestion module 16 may receive explicit permission from a user (e.g., the user of computing device 2) to access communications information, social media network information, or other information pertaining to the user. Suggestion module 16 may provide candidate responses that were selected by users of a computing device having a similar context as the determined current context of computing device 2.

One of applications 10 may receive an indication of the determined candidate responses, and send data to UI module 6 to cause UI device 4 to display the candidate responses. For instance, in the example of FIG. 1, application 10A may receive candidate responses to the text message, as determined by suggestion module 16 of response suggestion unit 14. Responsive to receiving the indication of the candidate responses, application 10A may send data to UI module 6 to cause UI device 4 to display the candidate responses as part of GUI 20.

As shown in the example of FIG. 1, GUI 20 includes response selection area 22. Response selection area 22 may be displayed in response to computing device 2 receiving input corresponding to a command to respond to the incoming communication. Response selection area 22 includes response options 24A-24D (collectively "response options 24"). In some examples, response options 24 may represent candidate responses received from response suggestion unit 14. In other examples, response selection area 22 may represent other response options, such as responses previously entered by the user of computing device 2 to similar incoming communications. In some examples, the candidate responses received by computing device 2 may be modified (e.g., by a receiving one of applications 10) based on various types of information, and response selection area 22 may contain one or more response options representing modified candidate responses. In any case, response selection area 22 of GUI 20 may enable the user of computing device 2 to select one of response options 24, such as response option 24A including the displayed text "I'll be there in 15 minutes," response option 24B including the displayed text "I'm on my way," or other response options. In the example of FIG. 1, response selection area 22 also includes manual entry option 26. Manual entry option 26 may be selectable by the user of computing device 2 to input a custom response. A custom response may be used when, for example, none of response options 24 are accurate predictions.

Inputting and selecting a custom response or selection of one of response options 24 may cause computing device 2 to respond to the incoming communication by sending the selected response to one or more other computing devices. The selected response (e.g., the one of response options 24 or a custom response selected by the user) may be sent to a computing device from which the incoming communication was received. In some examples, the selected response may be sent to additional or other computing devices. By enabling computing device 2 to obtain candidate responses and display response options 24, response suggestion unit 14 may reduce the amount of time required for a user of computing device 2 to input and send a response to an incoming communication. For instance, wearable computing devices, such as watches or other devices, may be able to display several candidate responses to a user that are based on a received incoming communication, thereby enabling the user to quickly tap or otherwise select one of the candidate responses instead of having to use voice recognition or other means to input a response.

Figure 2:
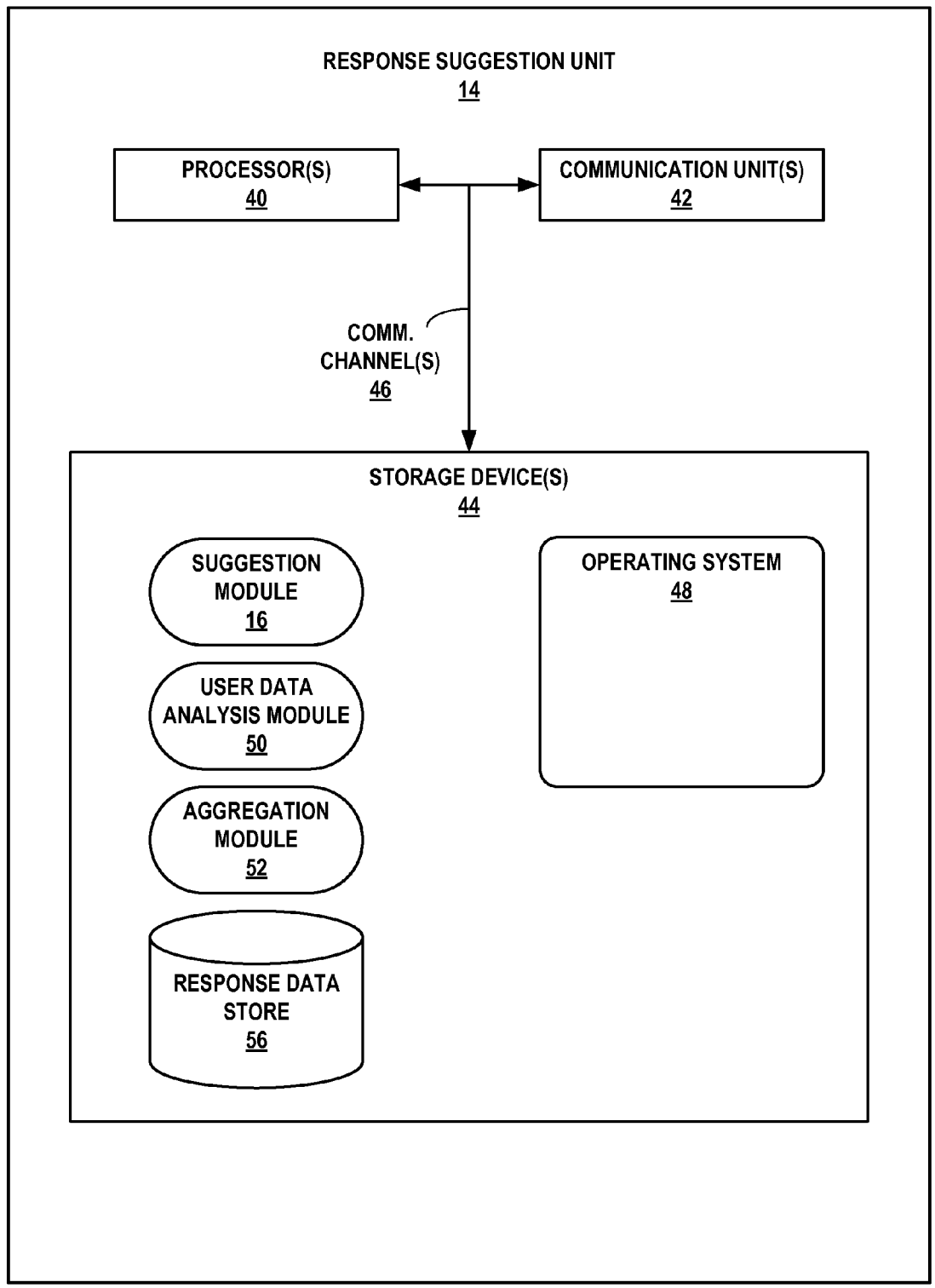
FIG. 2 is a block diagram illustrating one example of a response suggestion unit for providing candidate responses to an incoming communication, in accordance with one or more aspects of the present disclosure.

FIG. 2 is a block diagram illustrating one example of response suggestion unit 14, shown in FIG. 1, for providing candidate responses to an incoming communication, in accordance with one or more aspects of the present disclosure.

Response suggestion unit 14 may include hardware, firmware, software, or any combination thereof. In the example of FIG. 2, response suggestion unit 14 may comprise a hardware device, such as a server computer, having various hardware, firmware, and software components. However, FIG. 2 illustrates only one particular example of response suggestion unit 14, and many other examples of response suggestion unit 14 may be used in accordance with techniques of the present disclosure. In some examples, components of response suggestion unit 14 may be located in a singular location. In other examples, one or more components of response suggestion unit 14 may be in different locations (e.g., connected via network 12 of FIG. 1). That is, in some examples response suggestion unit 14 may be a conventional computing system, while in other examples, response suggestion unit 14 may be a distributed or "cloud" computing system.

As shown in the specific example of FIG. 2, response suggestion unit 14 includes one or more processors 40, one or more communications units 42, and one or more storage devices 44. Response suggestion unit 14 further includes operating system 48, suggestion module 16, aggregation module 50, and user data analysis module 52. In the specific example of FIG. 2, response suggestion unit 14 also includes response data store 56. In other examples, response data store 56 and/or modules 50 and 52 may not be included in response suggestion unit 14. That is, in some examples, modules 50 and 52 and/or response data store 56 may be external to, but accessible by, response suggestion unit 14.

Each of components 40, 42, and 44 may be interconnected (physically, communicatively, and/or operatively) for inter-component communications. In the example of FIG. 2, components 40, 42, and 44 may be coupled by one or more communications channels (COMM. CHANNELS) 46. In some examples, communications channels 46 may include a system bus, network connection, inter-process communication data structure, or any other channel for communicating data. In other examples, such as where response suggestion unit 14 is a distributed computing system or cloud-based computing system, communications channels 46 may include one or more network connections, such as portions of network 12 of FIG. 1. Modules 16, 50, and 52, as well as operating system 48, and response data store 56 may also communicate information with one another as well as with other components in response suggestion unit 14.

Processors 40, in one example, are configured to implement functionality and/or process instructions for execution within response suggestion unit 14. For example, processors 40 may be capable of processing instructions stored in storage devices 44. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

Response suggestion unit 14, in the example of FIG. 2, also includes one or more communication units 42. Response suggestion unit 14, in one example, utilizes communication units 42 to communicate with external devices via one or more networks, such as network 12 of FIG. 1. Communication units 42 may include a network interface card, such as an Ethernet card, an optical transceiver, a radio frequency transceiver, or any other type of device that can send and receive information. Other examples of such network interfaces may include Bluetooth, 3G and WiFi radio components as well as Universal Serial Bus (USB). In some examples, response suggestion unit 14 utilizes communication units 42 to wirelessly communicate with one or more external devices such as computing device 2 of FIG. 1. For instance, communication units 42 may receive a request for candidate responses from computing device 2, and provide the request to one or more other components of response suggestion unit 14 (e.g., modules 16, 50, 52).

One or more storage devices 44 may be configured to store information within response suggestion unit 14 during operation. Storage devices 44, in some examples, can be described as a computer-readable storage medium. In some examples, storage devices 44 are a temporary memory, meaning that a primary purpose of storage devices 44 is not long-term storage. Storage devices 44, in some examples, are described as a volatile memory, meaning that storage devices 44 do not maintain stored contents when the computer is turned off. Examples of volatile memories include random access memories (RAM), dynamic random access memories (DRAM), static random access memories (SRAM), and other forms of volatile memories known in the art. In some examples, storage devices 44 are used to store program instructions for execution by processors 40. Storage devices 44, in one example, are used by software or applications running on response suggestion unit 14 (e.g., modules 16, 50, and 52) to temporarily store information during program execution.

Storage devices 44, in some examples, also include one or more computer-readable storage media. Storage devices 44 may be configured to store larger amounts of information than volatile memory. Storage devices 44 may further be configured for long-term storage of information. In some examples, storage devices 44 include non-volatile storage elements. Examples of such non-volatile storage elements include magnetic hard discs, optical discs, floppy discs, flash memories, or forms of electrically programmable memories (EPROM) or electrically erasable and programmable memories (EEPROM).

In some examples, response suggestion unit 14 may contain more or fewer components. For instance, response suggestion unit 14 may contain one or more input devices, such as devices configured to receive input from a user or administrator through tactical, audio, or video feedback, and/or one or more output devices, such as devices configured to provide output to a user or administrator using tactile, audio, or video stimuli.

In the example of FIG. 2, response suggestion unit 14 includes operating system 48. Operating system 48, in some examples, controls the operation of components of response suggestion unit 14. For example, operating system 48, in one example, facilitates the communication of modules 16, 50, and 52 with processors 40, communication units 42, and storage devices 44. Modules 16, 50, and 52 may each include program instructions and/or data that are executable by response suggestion unit 14. As one example, user data analysis module 50 may include instructions that cause response suggestion unit 14 to perform one or more of the operations and actions described in the present disclosure.

Response suggestion unit 14 may receive a request for candidate responses from a computing device (e.g., computing device 2 of FIG. 1). The request for candidate responses may include information that was included in an incoming communication received by the computing device. For instance, the request may include information that was included in an incoming email, an incoming text message, an incoming application notification, an incoming calendar invite, and incoming reminder, or other incoming communication. In some examples, the request for candidate responses may include all of the information included in the incoming communication. That is, the request may include the entire email, text message, etc. In other examples, the request may include a portion of information. For instance, the request may include a date and time mentioned in the incoming communication, a location mentioned, the names of participants in a meeting, emoji, a picture, or other information.

The request for candidate responses may, in some examples, include other information. The other information may include information pertaining to the computing device that sent the request and/or information pertaining to a user of the computing device that sent the request. For instance, a request may include a unique identifier (e.g., an ID number) identifying the user and/or the computing device that sent the request, location information indicating one or more locations of the computing device, time information indicating a time and/or time zone setting of the computing device, application information indicating an application currently being executed by the computing device and/or an activity in which the application currently being executed is engaging, communications information indicating the type of the incoming communication (e.g., email, text message, calendar alert, or other type), the type of response that the computing device will be sending, the time at which the incoming communication was received, previous communications to or from the sender, user information indicating an occupation of the user, an activity in which the user is currently engaged, contact information indicating the sender of the incoming communication, one or more recipients of the response that the computing device will be sending, or other information. That is, the request for candidate responses may include any information usable by one or more components of response suggestion unit 14 to determine a current context of the computing device and tailor candidate responses to better predict a response to the incoming communication. Communications unit 42 of response suggestion unit 14 may receive the request for candidate responses and send the request to one or more other components of response suggestion unit 14, such as user data analysis module 50.

In the example of FIG. 2, user data analysis module 50 may be operable by processors 40 to receive a request for candidate responses, obtain information from one or more other sources, and/or determine a current context for the request. That is, in some examples, user data analysis module 50 may obtain information included in a received incoming communication and other information (e.g., from the request for candidate responses or other sources) and determine a context on which to base predicted replies to the incoming communication. In some examples, user data analysis module 50 may determine a context based on the information included in the request for candidate responses. In other examples, user data analysis module 50 may additionally or alternatively obtain supplemental information from other sources, such as an email account associated with a user of the computing device that sent the request, a social networking account of the user, web search history associated with the user, a location history associated with the user, or other sources.

User data analysis module 50 may only obtain supplemental information for a user if the user provides explicit permission. That is, user data analysis module 50 may only use various sources of information for predicting candidate responses if a user of the computing device that sent the request (e.g., computing device 2) explicitly allows response suggestion unit 14 to access the various sources. For instance, computing device 2 may prompt the user to provide a username and password for an email account, a social network service account, or other account. After receiving the information, computing device 2 may prompt the user to allow response suggestion unit 14 to access the account to obtain supplemental information. If the user explicitly agrees to allow access, computing device 2 may send an indication of the account and access credentials (e.g., a username and password or other information) to response suggestion unit 14. If response suggestion unit 14 receives explicit permission, user data analysis module 50 may obtain supplemental information.

User data analysis module 50 may be operable by processors 40 to determine a current context of a computing device at or near the time that the computing device sent a request for candidate responses. User data analysis module 50 may define a current context by determining contextual elements and weights. For instance, user data analysis module 50 may determine contextual elements (e.g., based on textual information and/or other information) and weigh each contextual element based on a predicted accuracy and/or a predicted importance of the element. For example, contextual elements may indicate a current location of the computing device, a time of day or current time, a type and/or name of an application being executed by the computing device, an activity in which the computing device is currently engaging, a user identification number for a user, a predicted destination of the user, a predicted mode of travel of the user, a predicted travel route of the user to the predicted destination, a predicted arrival time of the user at the predicted destination, a predicted current activity of the user, a predicted current availability of the user, a predicted future availability of the user (e.g., whether a user is available at a future point in time), a predicted time at which the user will be available, a predicted type of social relationship (e.g., professional, friendship, spouse, etc.) of the user, a predicted format of incoming communication (e.g., a status request, a status update, a request, or other format), a predicted format of response (e.g., a status update, a confirmation, an answer, etc.), a predicted tone, a predicted level of deference, or various other information.

In the example of FIG. 2, user data analysis module 50 may determine a contextual element indicating that the user of computing device 2 is currently at Location X based on location information included in the request received from computing device 2. User data analysis module 50 may also determine a contextual element indicating that the person to whom the user is responding (e.g., the addressee) is at Location Y, based on information included in the request (e.g., "Are you coming to the pub?") and/or additional information (e.g., a prior email from the addressee indicating a particular pub). User data analysis module 50 may further determine a contextual element indicating Location Y as a predicted destination of the user based on information included in the request (e.g., a current time) and supplemental information from an email account of the user (e.g., an email from the user to the addressee indicating that the user intends to meet the addressee at the pub at or near the current time).

Responsive to determining a predicted destination, user data analysis module 50 may determine contextual elements indicating a predicted travel mode of the user and/or a predicted travel route of the user. User data analysis module 50 may determine a predicted travel mode of the user based on location information, email information, web search information, or other information. For instance, user data analysis module 50 may receive location information from computing device 2 (e.g., as part of a request for candidate responses) indicating a plurality of locations at which computing device 2 was previously located (e.g., within the last 5 minutes, the last minute, or other time period) as well as the respective times at which computing device 2 was located at each location. User data analysis module 50 may determine a contextual element indicating a predicted travel mode based at least in part on the distance between each of the locations. For example, for locations determined at a given time interval, a short distance between the locations (e.g., 10 feet, 50 feet, 100 feet, etc.) may cause user data analysis module 50 to determine a "walking" element. A longer distance between locations may cause user data analysis module 50 to determine an element indicating another type of transportation. User data analysis module 50 may determine predicted travel modes indicating walking, bicycle, public transportation, automobile, airplane, or other transportation mode. As another example, user data analysis module 50 may receive obtain email information indicating that the user will be driving to the predicted destination. In the example of FIG. 2, user data analysis module 50 may determine, based on location information and/or other information, contextual element indicating that the user of computing device 2 is or will be travelling via automobile.

User data analysis module 50 may determine a contextual element indicating a predicted travel route that a user will take to get from the user's current location to the predicted destination. In various examples, the predicted travel route may include travel via various transportation modes, such as automobile, public transportation, bicycle, boat, airline/airplane, or other transportation mode. User data analysis module 50 may use map data and/or traffic data to determine the predicted travel route. That is, user data analysis module 50 may use information about one or more roadways, walkways, public transportation routes, waterways, airports, or other travel channels, as well as information about traffic conditions affecting those channels, to determine a travel route that the user may follow to reach the predicted destination. In the example of FIG. 2, user data analysis module 50 may determine a contextual element indicating a series of roadways from the user's location, Location X, to the predicted destination, Location Y.

User data analysis module 50 may also determine a contextual element indicating a predicted arrival time at the predicted destination, based on a predicted travel route and/or a predicted travel mode. After determining the predicted travel mode and predicted travel route, user data analysis module may determine the time it will take the user to use the predicted travel mode to get to the predicted destination by following the predicted travel route.

As another example, user data analysis module 50 may determine contextual elements indicating a predicted format-of-response and/or a format-of-incoming-communication. User data analysis module 50 may determine a format of the response or format of the incoming communication based on received information, such as the grammar, language and/or punctuation of the incoming communication. In some examples, user data analysis module 50 may also utilize other information, such as information from computing device 2 indicating a contact type (e.g., colleague, friend, family member, etc.) of the sender of the incoming communication. In the example of FIG. 2, based on the information included in the incoming communication (e.g., the words "Are you coming to the pub?"), user data analysis module 50 may determine a "status request" contextual element indicating the format of the incoming communication and a "status update" contextual element indicating the predicted format of the response.

In some examples, the determined contextual elements may be specific, such as an exact street address and/or name of an establishment as a predicted destination. In other examples, the contextual elements may be generalized (e.g., "home" or a city name as a current location), or a range of values (e.g., "early evening" or "3:00 PM-5:00 PM" as a current time).

In determining the current context of a computing device, user data analysis module 50 may determine a weight for each contextual element. The weighting may, in some examples, indicate the importance and/or certainty of the determined element. For instance, in the example of FIG. 2, user data analysis module 50 may weigh the contextual element indicating Location X very heavily because the current location of computing device 2 is likely to be very accurate. User data analysis module 50 may weigh the contextual element indicating the sender-location category and/or for the predicted-user-destination category (e.g., Location Y) lighter, because the text "the pub" is a general location identifier and Location Y may be the incorrect pub. By determining the current context, user data analysis module 50 may determine candidate responses that are more likely to be selected by a user. That is, user data analysis module 50 may use information included in an incoming communication and/or other information to predict a current context of a computing device and thereby provide candidate responses more likely to be selected based on the user's current status. User data analysis module 50 may provide information identifying the determined current context, including contextual elements and/or weights, to one or more other components of response suggestion unit 14 (e.g., suggestion module 16).

Suggestion module 16 may be operable by processors 40 to receive a request for candidate responses and use the received current context to determine at least one candidate response to an incoming communication. That is, suggestion module 16 may receive the request (e.g., from communication units 42) and the current context (e.g., from user data analysis module 50) and output candidate responses. Suggestion module 16 may determine candidate responses by searching response data store 56 for one or more responses that have been selected at least at a threshold frequency by one or more users, and create a set of responses. In some examples, response data store 56 may limit the set of responses to those responses that include at least a portion of the content included in the incoming communication. For instance, in the example of FIG. 2, suggestion module 16 may access and search response data store 56 to obtain a set of responses that each includes the words "are you coming" and end with a question mark. By searching for responses that include at least a portion of the information included in an incoming communication, suggestion module 16 may retrieve a set of responses that are more likely to have been used to respond to grammatically similar messages.

Suggestion module 16 may determine candidate responses based on the obtained set of responses. In some examples, suggestion module 16 may output all obtained responses as candidate responses. That is, in some examples suggestion module 16 may predict candidate responses based on the received information included in an incoming communication. In other examples, suggestion module 16 may output obtained responses that are more likely to be relevant based on the current context. For instance, suggestion module 16 may determine which of the set of obtained responses are associated (e.g., "tagged") with at least one of the received contextual elements. In some examples, any response not tagged with any of the received contextual elements may be discarded. That is, in some examples, suggestion module 16 may determine whether a particular response has been used in a similar context to the determined current context by determining whether the particular response is tagged with any of the contextual elements included in the current context.

In some examples, suggestion module 16 may treat certain contextual elements as more important than others. For instance, suggestion module 16 may determine which contextual elements are important based on each element's corresponding weight. Suggestion module 16 may rank the obtained responses based on the contextual elements with which each of the obtained responses is tagged and the corresponding weights for the contextual elements. For instance, suggestion module 16 may sum the weights of each element with which a response is tagged to determine a candidate response score for each response. Suggestion module 16 may then order the set of responses based on the determined response scores. In other examples, suggestion module 16 may only sum the weights of the heaviest weighted elements (e.g., the 5 heaviest elements, the 10 heaviest elements, etc.) in the current context. In yet other examples, suggestion module 16 may take the frequency at which each response has previously been selected into account when ranking the obtained responses. Suggestion module 16 may rank the set of obtained responses in various other ways in accordance with techniques of the present disclosure. In any case, suggestion module 16 may output one or more of the ranked responses (e.g., the top 3 ranked responses, the top 5 ranked responses, etc.) as candidate responses.

In the example of FIG. 2, the context data may include a "status update" contextual element indicating a format-of-response. "Status update" may have a heavy weight associated with it (e.g., indicating that the element is important and/or likely to be accurate). Consequently, suggestion module 16 may rank responses having a "status update" tag higher than responses not tagged with "status update." By retrieving a set of responses that was each selected at least at a threshold frequency by users, suggestion unit 16 may obtain responses from response data store 56 that are commonly used to reply to incoming communications. Furthermore, by using the determined current context to determine and/or rank candidate responses, it may be more likely that the user or other users selected the candidate responses at least at the threshold frequency in the same or a similar context to that of a current request for candidate responses. That is, by determining candidate responses that have at least one contextual element in common with the current context, suggestion unit 16 may increase the likelihood that candidate responses are relevant to a user's current situation. Suggestion unit 16 may output at least one candidate response to one or more other components of response suggestion unit 14 (e.g., communication units 42 and/or aggregation module 52).

In the example of FIG. 2, communications units 42 may send the candidate responses to computing device 2 in accordance with one or more techniques of the present disclosure. Computing device 2 may receive a selection of a response (e.g., corresponding to a user performing a gesture at UI device 4) and computing device 2 may send the selected response to one or more recipients. The selected response may correspond to a candidate response or a custom response (e.g., a response created by the user of computing device 2). In some examples, computing device 2 may also send an indication of the selected response to response suggestion unit 14. Communication units 42 may receive the indication and send the indication to one or more other components of response suggestion unit 14 (e.g., aggregation module 52).

Aggregation module 52, in the example of FIG. 2, may be operably by processors 40 to receive one or more candidate responses, a determined current context used to determine the candidate responses, and/or an indication of a selected response and may cause response data store 56 to store or update relevant information based on the received information. For instance, aggregation module 52 may receive contextual elements and weights from user data analysis module 50, candidate responses from suggestion module 16, and an indication of a selected response from computing device 2. Aggregation module 52 may be responsible, at least in part, for creating and/or updating the repository of responses and associated information (e.g., response data store 56) for determining what responses are applicable for a determined context. In some examples, such as when the selected response is not a response stored in response data store 56 (e.g., if the indication indicates a response manually entered and selected by a user instead of a selected candidate response), aggregation module 52 may tag the selected response with the proper values from the context data, and add the response to response data store 56. That is, aggregation module 52 may create a new entry in response data store 56 and store at least an indication of the manually entered response. In order to determine the context in which the response was manually entered and selected, aggregation module 52 may store additional information associated with the response. The additional information may include at least an indication of the incoming communication to which the response was used as a response and/or one or more contextual elements determined based on a corresponding request. Aggregation module 52 may store the additional information as tags usable by suggestion module 16 to compare to a current context determined from future requests.

When the selected response was a candidate response, aggregation module 52 may modify a frequency value, stored in response data store 56, associated with the candidate response that was selected. For instance, in the example of FIG. 2, the user of computing device 2 may select response option 24B, and response suggestion unit may receive an indication of the selection. Aggregation unit 52 may increase the frequency value of the associated response (e.g., "I'm on my way!") within response data store 56.

In some examples, aggregation module 52 may modify one or more of the frequency values associated with the candidate responses that were not selected. That is, in some examples, aggregation module 52 may reduce the frequency associated with the un-selected responses, thereby making it less likely that the un-selected responses will be sent to a user in the future. In this way, aggregation module 52 may keep response data store 56 up to date in order to more accurately predict candidate responses.

In the example of FIG. 2, response data store 56 may store one or more responses, contextual elements associated with each of the one or more responses, and/or a frequency with which the responses were selected by one or more users. Responses, associated frequency information, and/or context data may be stored within response data store 56 using a range of one or more data structures, such as an array, a list, a database, a structured file (such as a file encoded using a markup language) or other data structure. That is, response data store 56 may contain data in any format capable of being created and/or accessed by one or more other components of response suggestion unit 14.

In some examples, response data store 56 may include information received from users and/or information provided by managers or administrators of response suggestion unit 14. For instance, response data store 56 may receive instructions from one or more modules of response suggestion unit 14 (e.g., aggregation module 52) to create or modify data within response data store 56. In some examples, response data store 56 may require administrator approval before storing or modifying information. Requiring administrator approval before storing or modifying information may help to ensure that erroneous or inappropriate responses are not stored and thus not suggested as subsequent candidate responses. In other examples, response data store 56 may automatically store information as instructed by aggregation module 52, such as when other management procedures are used.

By receiving a request for candidate responses from a computing device, determining at least one candidate response that was selected at least at a threshold frequency by users, and sending the at least one candidate response to the computing device, response suggestion unit 14 may decrease the time and/or effort required to respond to incoming communications. Furthermore, by receiving an indication of a selected response and updating a database of stored responses and associated context information, response suggestion unit 14 may provide accurate candidate responses that are more likely to be relevant to a user's current situation. Consequently, in accordance with one or more techniques of the present disclosure, the user may be presented with at least one response option that he or she may select to send as a response to an incoming communication thereby reducing the likelihood that the user will need to manually enter a response.

FIGS. 3A and 3B are conceptual diagrams illustrating example GUIs for providing candidate responses to an incoming communication, in accordance with one or more aspects of the present disclosure. The examples of FIGS. 3A and 3B are described below within the context of FIGS. 1 and 2. In the examples of FIGS. 3A and 3B, GUIs 100 and 110 may be outputted for display by an internal display device of computing device 2. In other examples, GUIs 100 and 110 may be outputted by one or more components of computing device 2 for display at an external display device and/or at a remote computer device.

Computing device 2 may output GUI 100 of FIG. 3A in response to receiving user input associated with a manual entry mode. For instance, computing device 2 may output GUI 100 in response to receiving a user's selection of manual entry option 26 of FIG. 1. That is, computing device 2 may receive an incoming communication (e.g., from another computing device) and, subsequent to receiving the incoming communication, computing device 2 may receive an instruction to respond to the incoming communication from the user. In accordance with the techniques of the present disclosure, computing device 2 may send a request for candidate responses to response suggestion unit 14 and receive at least one candidate response in return. After displaying the at least one candidate response, computing device 2 may receive a selection of manual entry option 26.

Manual entry mode may enable a user to input a custom response at computing device 2. In some examples, the user may input a custom response by selecting characters on a keyboard or a graphical keyboard. In other examples, the user may input a response by speaking the custom response (e.g., using voice-to-text transcription) or inputting the custom response in some other fashion. In any case, in the example of FIG. 3A, computing device 2 may have received input corresponding to displayed text 102. As shown in FIG. 3A, displayed text 102 includes "That's 30 minutes away. I'll be there in 10."

In the examples of FIGS. 3A and 3B, computing device 2 may subsequently receive input from the user to send displayed text 102 as a custom response to the incoming communication. Responsive to receiving the input, computing device 2 may send the custom response to one or more other computing devices (e.g., as a text message, an email, or other communication). In accordance with techniques of the present disclosure, computing device 2 may also send at least an indication of the custom response to response suggestion unit 14.

Response suggestion unit 14 may receive the indication and provide the indication to aggregation module 52. In the example of FIG. 3A, response data store 56 may not previously have received and/or stored a response that corresponds to displayed text 102. That is, FIG. 3A may represent the first time that response suggestion unit 14 received the particular custom response. Consequently, Aggregation unit 52 may associated the response with the corresponding incoming communication and tag the custom response with the appropriate contextual elements (e.g., received from user data analysis module 50). Tags may include any contextual elements associated with the custom response. In the example of FIG. 3A, the custom response may be tagged with a geographical location of computing device 2 (e.g., Location X), a format-of-incoming-communication (e.g., "status request"), a format-of-response (e.g., "status update"), a value indicating the computing device (e.g., computing device 2) and/or a tag indicating the user, and other contextual elements. Aggregation module 52 may then store the custom response, corresponding incoming communication, and contextual elements in response data store 56 for potential future use as described herein.

Computing device 2 may subsequently receive a second incoming communication. For instance, computing device 2 may receive a text message including the text "We're at the restaurant." After receiving the incoming communication, computing device 2 may receive input instructing computing device 2 to respond to the incoming communication. Computing device 2 may send a request for candidate responses to response suggestion unit 14, including information from the second incoming communication and/or other information (e.g., location information).

Response suggestion unit 14 may receive the request, and provide at least a part of the information included in the request to user data analysis module 50. User data analysis module 50 may analyze the textual information and/or the other information to determine a current context for computing device 2. For instance, based on the textual information, and other information, user data analysis module 50 may determine various contextual elements and associated weights and send the current context to suggestion module 16.

In the examples of FIGS. 3A and 3B, the current context may include a contextual element indicating the user of computing device 2. The element may be a unique identifier based on information received from computing device 2, such as a phone number, a device ID number, or other information. That is, the user ID may be an arbitrary value assigned to a user and/or computing device. The user ID element may have a very heavy associated weight (e.g., because the certainty of the user ID is high). Consequently, suggestion module 16 may treat responses tagged with the same user ID as more contextually relevant than other responses that are not tagged with the user ID. In this way, suggestion module 16 may dynamically treat custom responses of a particular user as more important and/or appropriate for that user than responses received from other users. In other words, responses the user has previously selected may be treated as more relevant than other responses.

In some examples, suggestion module 16 may not select a response as a candidate response unless and until the response has been used at least a threshold number of times. That is, in some examples aggregation module 52 may store a new response, such as a received custom response, but suggestion module 16 may not select the new response as a candidate response until response suggestion unit 14 has received the custom response as a selected response a threshold number of times. By limiting candidate responses to those responses that have been used at least a threshold number of times, response suggestion unit 14 may ensure that custom responses are suggested only after gaining a sufficient amount of popularity. For instance, while described in the examples of FIGS. 3A and 3B as being a candidate response after a first usage, suggestion module 16 may only output the response corresponding to displayed text 102 as a candidate response after response suggestion unit 14 has received the response as a selected response a threshold number of times (e.g., 3 times, 5 times, 10 times, etc.).

In some examples, a current context may include a contextual element indicating a level of deference. The level of deference may indicate a level of deference or apology to be used in a response. User data analysis module 50 may, in some examples, determine a level of deference based on information indicating the number of times the user has received an incoming communication having a similar context (e.g., from the same sender, of the same format, etc.). For instance, the information may indicate the number of times within a period of time (e.g., an hour, a day, a week, etc.) the user has received similar incoming communications from the sender. In other examples, the level of deference may be based on other information, such as the information included in the incoming communication.

In the examples of FIGS. 3A and 3B, user data analysis module 50 may determine an "apologetic" contextual element, based on textual information and/or other information (e.g., information included in the request for candidate responses or from other sources). For instance, user data analysis module 50 may receive an indication that the user of computing device 2 has recently received multiple messages having a similar context from the sender of the current message. That is, in the examples of FIGS. 3A and 3B, the sender of the second incoming message, "We're at the restaurant," may have recently sent two or three previous incoming messages to the user of computing device 2. Based on the received current context, suggestion module 16 may select, as candidate responses, responses having an appropriate level of deference by selecting responses tagged with the "apologetic" element.

In some examples, techniques of the present disclosure may enable suggestion module 16 to account for a level of deference when selecting candidate responses by only keeping responses in the set that includes a proper tag. For instance, suggestion module 16 may not select an "I'm on my way!" response as a candidate response because it was not tagged with an "apologetic" element. Suggestion module 16 may instead select an "I'm sorry. I'm on my way!" response, because it was tagged with the "apologetic" element (among other tags). In other examples, suggestion module 16 may account for certain contextual elements by modifying one or more of the obtained responses to determine the candidate responses. That is, suggestion module 16 may obtain a set of responses selected at least at a threshold frequency, rank the obtained responses based on various weights for contextual elements, and then modify one or more of the ranked responses based on other contextual elements, such as a level of deference, a predicted travel duration, or other contextual elements. For instance, suggestion module 16 may obtain responses from response data store 56 and rank the obtained responses based on weights for one or more contextual elements of the current context. Suggestion module 16 may then modify one or more of the ranked responses, based on the "apologetic" contextual element. In such instance, suggestion module 16 may, for example, add the text, "I'm sorry" to the beginning of a response to form a candidate response. As another example of possible modification of ranked responses, suggestion module 16 may modify a numerical value within a response to accurately reflect the current context (e.g., a predicted-arrival-time, a duration-of-activity, etc.). That is, in various examples, response suggestion unit 14 may use the determined current context to determine candidate responses in a variety of ways in accordance with the techniques of the present disclosure.

In some examples, a candidate response may be tagged with elements not included in the current context. In some examples, a candidate response may not be tagged with all contextual elements included in the current context. That is, suggestion module 16 may output, as a candidate response, a response tagged with contextual elements corresponding to heavy weights, even if the response is not tagged with all contextual elements in the current context, or is tagged with values not in the current context. For instance, a response may not be tagged with the "apologetic" element, but may still be outputted as a candidate response, because the response is tagged with a number of other heavily weighted contextual elements. After determining candidate responses, response suggestion unit 14 may send the candidate responses to the computing device from which the request was received.

FIG. 3B includes GUI 110. Computing device 2 may output GUI 110 in response to receiving the candidate responses from response suggestion unit 14. GUI 110 includes background 112 and response selection area 114. Response selection area 114 may be presented in a manner visually different from background 112. For instance, background 112 may be shown in a different color than 114. As another example, background may be shown out of focus and/or shaded, while response selection area 114 may be clearer and/or un-shaded. As shown in the example of FIG. 3B, background 112 is shaded darker than response selection area 114.

In the example of FIG. 3B, response selection area 114 includes response options 116A-116D (collectively, "response options 116"). Response options 116 may, in some examples, each represent a candidate response outputted by response suggestion unit 14 based at least in part on the determined current context of computing device 2. For instance, suggestion module 16 may output a first candidate response corresponding to response option 116A, "I'll be there in approximately 15 minutes," based on a number of contextual elements, such as a "status request" element, a user-location element, Location X, a predicted-destination element, Location Z (e.g., the restaurant), and a predicted-arrival-time element, "15 minutes." As another example, response option 116B (e.g., the custom response previously entered by the user) may correspond to a candidate response selected, by response suggestion unit 14, based on a contextual element identifying the user of computing device 2. Response options 116C and 116D may each correspond to candidate responses selected based at least on an "apologetic" element of the determined current context.

By determining candidate responses based at least in part on a variety of contextual elements, response suggestion unit may enable computing device 2 to allow a user to select a response that is relevant to the user's current situation, without having to manually enter the response. Additionally, by receiving an indication of selected responses, response suggestion unit 16 may more accurately predict candidate responses for future requests.

FIGS. 4A and 4B are conceptual diagrams illustrating example GUIs for providing candidate responses to an incoming communication, in accordance with one or more aspects of the present disclosure. The examples of FIGS. 4A and 4B are described below within the context of FIGS. 1 and 2. In the examples of FIGS. 4A and 4B, GUIs 150 and 170 may be outputted for display by an internal display device of computing device 2. In other examples, GUIs 150 and 170 may be outputted by one or more components of computing device 2 for display at an external display device and/or at a remote computer device.

One of applications 10 (e.g., an email application) of computing device 2 may output GUI 150 of FIG. 4A, for display. In the example of FIG. 4A, GUI 150 may include various information from an incoming communication (e.g., an email), such as a subject of the incoming communication (e.g., "Meeting to discuss hiring Mr. F"), a sender of the incoming communication (e.g., "Erica Davis"), and body text for the incoming communication. In other examples, GUI 150 may include more or different information from the incoming communication.

GUI 150 may also include one or more selectable options, such as reply option 152. Responsive to receiving input indicating a selection of reply option 152, one or more components of computing device 2 may generate and send a request for candidate responses, in accordance with the techniques of the present disclosure. That is, when computing device 2 receives instructions to enable the user to respond to the incoming communication, computing device 2 may generate a request including an indication of at least part of the information included in the incoming communication. In the examples of FIGS. 4A and 4B, the request for candidate responses may include information indicating the sender of the email, the recipient of the email (e.g., "Bob Andrews"), the subject of the email, the time at which the email was delivered, and at least a part of the body text of the email. Specifically, the request for candidate responses may include the date and time mentioned in the body text of the email.

In some examples, the request for candidate responses may also include other information, such as location information (e.g., determined by device location module 8), a device identifier, a user identifier, a current time, a type of incoming communication, or other information. In the examples of FIGS. 4A and 4B, the request for candidate responses may include location information identifying a sequence of determined locations (e.g., the 10 most recent determinations). The request may also include an identifier of computing device 2, an identifier of the user (e.g., Bob Andrews), stored contact information for the sender of the email, and other information. Computing device 2 may send the request for candidate responses to response suggestion unit 14.

In accordance with the techniques of the present disclosure, response suggestion unit 14 may receive the request for candidate responses, and determine a current context of computing device 2 representing the context within which the response to the incoming communication is to be sent. In some examples, one or more components of response suggestion unit 14 (e.g., user data analysis module 50) may obtain additional information upon which to determine the current context. For instance, user data analysis module 50 may receive permission from the user to access a calendar of the user, a social networking service account of the user, or other source of information. Response suggestion unit 14 may use the received textual information and/or other information to determine a current context.

In the examples of FIGS. 4A and 4B, user data analysis module 50 may determine a contextual element indicating a user ID for Bob Andrews, a contextual element indicating the sender of the incoming communication (e.g., "Erica Davis"), a contextual element indicating the type of incoming communication (e.g., "email"), and a contextual element indicating the type of response (e.g., "email") based at least in part on the information included in the request. User data analysis module 50 may determine a "professional" contextual element indicating a social-relationship between the user (e.g., Bob Andrews) and the sender of the incoming communication (e.g., Erica Davis). User data analysis module 50 may determine the social-relationship based at least in part on the contact information received with the request (e.g., information identifying Erica Davis as a work colleague).

User data analysis module 50 may, in the examples of FIGS. 4A and 4B, obtain additional information from a calendar service of the user. Based at least in part on the obtained information, user data analysis module 50 may determine a contextual element, "busy," corresponding to a predicted future availability of the user. That is, user data analysis module 50 may determine that Bob Andrews is busy at the requested meeting time and determine a contextual element accordingly. Additionally, user data analysis module 50 may determine a contextual element indicating an available time. For instance, user data analysis module 50 may determine the nearest available time to the requested meeting time, the nearest block of time that meets a threshold size (e.g., 1 hour, 2 hours, etc.), or other indicator of an available time. In the examples of FIGS. 4A and 4B, user data analysis module 50 may determine "Wednesday, May 31, 2013 1:00 PM-3:00 PM" as the available time category. That is, user data analysis module 50 may determine that the user is busy during the requested day and time, but is available during the afternoon on the requested day.

User data analysis module 50 may determine a contextual element indicating a predicted mode of travel based at least in part on location information included in the request. For instance, user data analysis module 50 may determine a contextual element indicating a motor vehicle or automobile, a bike, public transportation, a plane, a train, walking, or other mode of travel. In the examples of FIGS. 4A and 4B, the location information may indicate a series of consecutive points on a roadway. The points may be sufficiently spread out as to indicate that computing device 2 is travelling at a relatively high velocity (e.g., over 10 miles per hour, over 40 miles per hour, etc.). Based at least in part on this determination, user data analysis module 50 may determine an "automobile" element.

In addition to the contextual elements, user data analysis module 50 may determine weights for one or more of the determined elements. Each weight may correspond to the predicted accuracy and/or importance of the associated contextual element. For instance, user data analysis module 50 may determine a heavy weight for a contextual element that is an important part of the current context, such as an element indicating a format of the incoming communication or a format of the response, or for a contextual element that is very likely to be accurate, such as an element indicating a user or a user location. User data analysis module 50 may determine a lighter weight for a contextual element that is less important or less probable. In the examples of FIGS. 4A and 4B, user data analysis module 50 may determine relatively heavy weights for the contextual elements indicating the type of response, the type of incoming communication, the user, the sender, the predicted future availability, the social relationship, and the format of the incoming communication. User data analysis module 50 may determine relatively lighter weights for the contextual elements indicating the format of the response, the predicted mode of travel, and the available time. In some examples, user data analysis module 50 may provide the determined current context (including the contextual elements and the associated weights) to suggestion module 16 and aggregation module 52 in accordance with the techniques of the present disclosure.

Suggestion module 16 may access response data store 56 and obtain a set of responses that were selected at least at a threshold frequency by the user of computing device 2 and/or other users, and that were used to respond to incoming communications that included at least a portion of the information included in the request (e.g., "Meeting to discuss [subject]" and/or "discuss [topic] with [participants] on [date/time].") That is, suggestion module 16 may obtain a set of responses that includes responses selected at least at the threshold frequency and that were used to respond to an incoming communication that is the same or similar to the incoming communication indicated by the present request for candidate responses. After obtaining the set of responses, suggestion module may use the current context to determine candidate responses.

In some examples, suggestion module 16 may discard obtained responses that are not tagged with at least one contextual element of the current context. That is, suggestion module 16 may only keep responses that are tagged with at least one contextual element of the current context, and thus are associated with a context that is the same or similar to the determined current context. Additionally or alternatively, suggestion module 16 may rank the responses based at least in part on the weights included in the current context. That is, suggestion module 16 may determine one or more tags of a response and determine a score for the response based at least in part on the weights associated with contextual elements corresponding to the tags. Suggestion module 16 may output, as a candidate response, at least one obtained response. That is, in various examples, suggestion module 16 may output, as candidate responses, all responses obtained from response data store 56, all obtained responses that are tagged with at least one contextual element included in the current context, or any number of the obtained responses that are ranked most highly. In any case, the at least one candidate response may be sent by response suggestion unit 14 to computing device 2.

Turning to FIG. 4B, computing device 2 may display output GUI 170 for display in response to receiving the candidate responses from response suggestion unit 14. GUI 170 includes response selection area 172. Response selection area 172 includes response options 174A-174D (collectively, "response options 174") as well as custom response option 176, response preamble 178 and response conclusion 180.

Response preamble 178 and/or response conclusion 180 may represent general elements applicable to all response options. Response preamble 178 and/or response conclusion 180 may be determined by computing device 2, by response suggestion unit 14, or some combination thereof. For instance, computing device 2 may determine a response preamble and a response conclusion based on information included in an incoming communication (e.g., the sender's name), user preferences (e.g., an email signature), or other information. In the example of FIG. 4B, response suggestion unit 14 may determine response preamble 178 and response conclusion 180 based at least in part on the "email" contextual element indicating the type of response and/or the "professional" contextual element indicating the social relationship.

In the example of FIG. 4B, GUI 170 includes response options 174. Response options 174, in various examples, may correspond to candidate responses received from response suggestion unit 14, responses stored at computing device 2, responses stored at computing device 2 but modified by response suggestion unit 14, responses received from response suggestion unit 14 but modified by computing device 2, or some combination thereof. In the example of FIG. 4B, each of response options 174 may represent a candidate response outputted by suggestion module 16 and received from response suggestion unit 14. For instance, the response corresponding to response option 174A may have been selected or used by the user of computing device 2 in a number of previous contexts that are similar to the determined current context. That is, because the response is tagged with the relevant user value (e.g., a contextual element having a heavy weight), the response may be ranked highly by suggestion module 16 even though the "automobile" element was associated with a lighter weight.

As another example, suggestion module 16 may rank the responses corresponding to response option 174B and 174C highly based at least in part on the high weight associated with the "busy" contextual element. Response option 174B may correspond to a slightly higher ranked response than response option 174C, because the contextual element indicating the available time may be associated with a very light weight. That is, in some examples, if the associated weight (e.g., a negative value) indicates that a contextual element is uncertain, responses that are not tagged with the uncertain contextual element may be ranked higher than those that are tagged with the uncertain element.

Responsive to outputting GUI 170 for display, computing device 2 may receive input indicating a selection of one of response options 174 or custom response option 176. In accordance with the techniques of the present disclosure, computing device 2 may generate the response (e.g., including response preamble 178, the selected option, and response conclusion 180) and send the response to one or more other computing devices. That is, computing device 2 may enable the user to select an option and send a response to the incoming communication. In addition, computing device 2 may send at least an indication of the selected response to response suggestion unit 14. By analyzing selected responses and modifying response data store 56, response suggestion unit 14, in some examples, may more accurately predict relevant responses to subsequent incoming communications.

Figure 5:
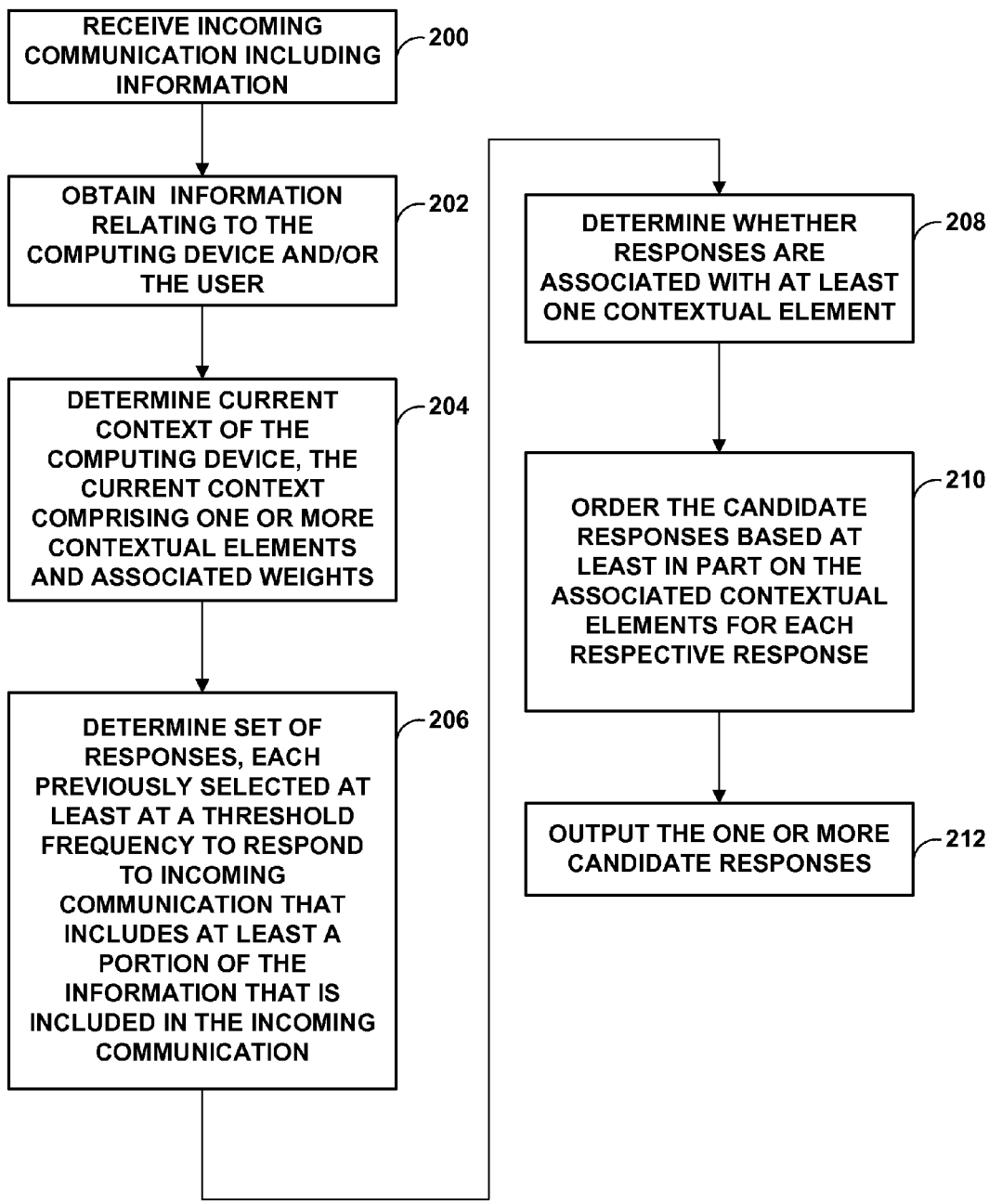
FIG. 5 is a flow diagram illustrating example operations for providing candidate responses to an incoming communication, in accordance with one or more aspects of the present disclosure.

FIG. 5 is a flow diagram illustrating example operations for providing candidate responses to an incoming communication, in accordance with one or more aspects of the present disclosure. For purposes of illustration only, the example operations of FIG. 5 are described below within the context of FIGS. 1 and 2.

In the example of FIG. 5, response suggestion unit 14 may receive an indication of an incoming communication, the incoming communication including information, from a computing device (e.g., computing device 2) (200). Response suggestion unit 14 may obtain information relating to computing device 2 and/or to a user of computing device 2 (202). For example, response suggestion unit 14 may receive other information from computing device 2 in addition to the indication of the incoming communication and/or may access other sources to obtain additional information. Response suggestion unit 14 may determine a current context of computing device 2, the current context comprising one or more contextual elements and associated weights (204). Based at least in part on the determined current context, response suggestion unit 14 may determine a set of responses, each previously selected at least at a threshold frequency to respond to an incoming communication that includes at least a portion of the received information (206). Response suggestion unit 14 may determine whether the responses are tagged with at least one contextual element included in the determined current context (208). Response suggestion unit 14 may order the one or more candidate responses based at least in part on the associated contextual elements for each respective response (210). Response suggestion unit 14 may then output a set of candidate responses from the one or more candidate responses (e.g., to computing device 2) (212).

Figure 6:
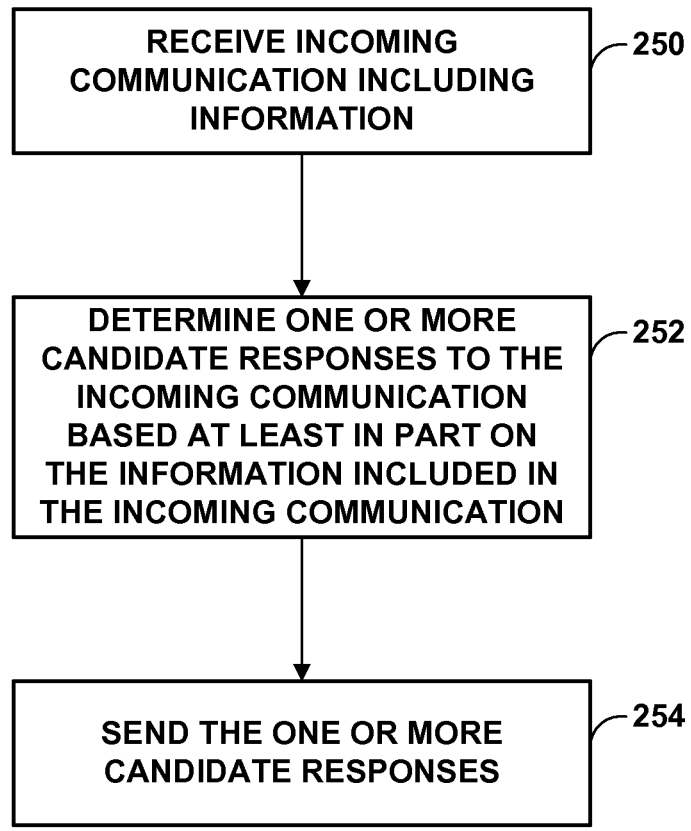
FIG. 6 is a flow diagram illustrating example operations for providing candidate responses to an incoming communication, in accordance with one or more aspects of the present disclosure.

FIG. 6 is a flow diagram illustrating example operations for providing candidate responses to an incoming communication, in accordance with one or more aspects of the present disclosure. For purposes of illustration only, the example operations of FIG. 6 are described below within the context of FIGS. 1 and 2.

In the example of FIG. 6, Response suggestion unit 14 may receive (e.g., from computing device 2) an incoming communication including information (250). Response suggestion unit 14 may determine one or more candidate responses to the incoming communication, based at least in part on the information included in the incoming communication (252). At least one candidate response from the one or more candidate responses may have previously been selected at least at a threshold frequency by one or more users. Response suggestion unit 14 may then send (e.g., to computing device 2) a set of candidate responses from the one or more candidate responses (254).

In some examples, the operations described in the example of FIG. 6 may further include receiving, by the computing system, a current location of the computing device, wherein the one or more candidate responses are determined based at least in part on the current location. In some of these examples, the operations may also include determining, based at least in part on the current location, a predicted destination of the user, and determining, based on an amount of traffic along a travel route from the current location to the predicted destination, a predicted arrival time of the user at the predicted destination, wherein the one or more candidate responses are determined based at least in part on the predicted arrival time.

In some examples, the operations described in the example of FIG. 6 may further include determining, by the computing system, based at least in part one or more previous communications of the user, a level of deference to a sender of the incoming communication, wherein the one or more candidate responses are determined based at least in part on the level of deference. In some of these examples, the operations may also include one or more of: receiving, by the computing system, a current location of the computing device, wherein the one or more candidate responses are determined based at least in part on the current location; and determining, based at least in part on the current location, a predicted destination of the user, and determining, based on an amount of traffic along a travel route from the current location to the predicted destination, a predicted arrival time of the user at the predicted destination, wherein the one or more candidate responses are determined based at least in part on the predicted arrival time.

In some examples, the operations described in the example of FIG. 6 may further include determining, by the computing system, based at least in part on calendar data associated with the user, that the user is currently busy, and responsive to determining that the user is currently busy, determining, based at least in part on the calendar data, a predicted time at which the user will be available, wherein the one or more candidate responses are determined based at least in part on the predicted time at which the user will be available. In some of these examples, the operations may also include one or more of: determining, by the computing system, based at least in part one or more previous communications of the user, a level of deference to a sender of the incoming communication, wherein the one or more candidate responses are determined based at least in part on the level of deference; receiving, by the computing system, a current location of the computing device, wherein the one or more candidate responses are determined based at least in part on the current location; and determining, based at least in part on the current location, a predicted destination of the user, and determining, based on an amount of traffic along a travel route from the current location to the predicted destination, a predicted arrival time of the user at the predicted destination, wherein the one or more candidate responses are determined based at least in part on the predicted arrival time.

In some examples of the operations of FIG. 6, determining the one or more candidate responses includes determining a set of responses, wherein each response from the set of responses was previously selected, by at least one of the user and the one or more other users and at least at the threshold frequency, to respond to a respective incoming communication that includes at least a portion of the information included in the incoming communication, determining a current context of the computing device, the current context including one or more contextual elements, determining whether each response from the set of responses is associated with at least one contextual element from the one or more contextual elements, and, responsive to determining that at least one response from the set of responses is associated with the at least one element, including the at least one response in the one or more candidate responses. In some of these examples, at least one contextual element of the one or more contextual elements indicates at least one of: a mode of travel of the user, an activity in which the user is currently engaged, an availability of the user, a location of the user, a current time, an application that received the incoming communication, a type of incoming communication, a type of response, a format of incoming communication, a format of response, a sender of the incoming communication, a type of social relationship between the user and the sender, and a level of deference to the sender.

In some examples, determining the current context includes determining a respective weight for each contextual element from the one or more contextual elements, and including the at least one response in the one or more candidate responses includes determining, based at least in part on the respective weight for each contextual element from the at least one contextual element, a respective score associated with the at least one response, and ordering the one or more candidate responses based at least in part on the respective score. In some of these examples, at least one contextual element of the one or more contextual elements indicates at least one of: a mode of travel of the user, an activity in which the user is currently engaged, an availability of the user, a location of the user, a current time, an application that received the incoming communication, a type of incoming communication, a type of response, a format of incoming communication, a format of response, a sender of the incoming communication, a type of social relationship between the user and the sender, and a level of deference to the sender.

In any of the example operations, the operations may further include receiving, by the computing system, an indication of a selection of a candidate response from the set of candidate responses and responsive to receiving the indication of the selection, modifying, by the computing system, a frequency value indicating a frequency at which the candidate response was previously selected by at least one of the user and the one or more other users. Some of these examples may include, responsive to receiving the indication of the selection, associating the candidate response with at least one contextual element of a current context of the computing device.

In any example operations not including receiving an indication of a selection of a candidate response from the set of candidate responses, the operations may further include receiving, by the computing system, an indication of a selection of a custom response, the custom response being a response that is different from each candidate response from the one or more candidate responses, and responsive to receiving the indication of the selection, storing, by the computing system, at least an indication of the custom response.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, by a computing system having at least one processor, from a computing device associated with a user, an indication of an incoming communication, the incoming communication including information;
determining, by the computing system, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users; and
sending, by the computing system, to the computing device, a set of candidate responses from the one or more candidate responses.

2. The method of claim 1, further comprising receiving, by the computing system, a current location of the computing device, wherein the one or more candidate responses are determined based at least in part on the current location.

3. The method of claim 2, further comprising:
determining, based at least in part on the current location, a predicted destination of the user; and
determining, based on an amount of traffic along a travel route from the current location to the predicted destination, a predicted arrival time of the user at the predicted destination, wherein the one or more candidate responses are determined based at least in part on the predicted arrival time.

4. The method of claim 1, further comprising:
determining, by the computing system, a level of deference to a sender of the incoming communication,
wherein at least one of the one or more candidate responses includes the word "sorry" based on the level of deference.

5. The method of claim 1, further comprising:
determining, by the computing system, based at least in part on calendar data associated with the user, that the user is currently busy; and
responsive to determining that the user is currently busy, determining, based at least in part on the calendar data, a predicted time at which the user will be available, wherein the one or more candidate responses are determined based at least in part on the predicted time at which the user will be available.

6. The method of claim 1, wherein determining the one or more candidate responses comprises:
determining a set of responses, wherein each response from the set of responses was previously selected, by at least one of the user and the one or more other users and at least at the threshold frequency, to respond to a respective incoming communication that includes at least a portion of the information included in the incoming communication;

determining a current context of the computing device, the current context including one or more contextual elements;

determining whether each response from the set of responses is associated with at least one contextual element from the one or more contextual elements; and responsive to determining that at least one response from the set of responses is associated with the at least one element, including the at least one response in the one or more candidate responses.

7. The method of claim 6, wherein determining the current context comprises determining a respective weight for each contextual element from the one or more contextual elements, and wherein including the at least one response in the one or more candidate responses comprises:

determining, based at least in part on the respective weight for each contextual element from the at least one contextual element, a respective score associated with the at least one response; and ordering the one or more candidate responses based at least in part on the respective score.

8. The method of claim 7, wherein at least one contextual element of the one or more contextual elements indicates at least one of: a mode of travel of the user, an activity in which the user is currently engaged, an availability of the user, a location of the user, a current time, an application that received the incoming communication, a type of incoming communication, a type of response, a format of incoming communication, a format of response, a sender of the incoming communication, a type of social relationship between the user and the sender, and a level of deference to the sender.

9. The method of claim 1, further comprising:

receiving, by the computing system, an indication of a selection of a candidate response from the set of candidate responses; and responsive to receiving the indication of the selection, modifying, by the computing system, a frequency value indicating a frequency at which the candidate response was previously selected by at least one of the user and the one or more other users.

10. The method of claim 9, further comprising:

responsive to receiving the indication of the selection, associating the candidate response with at least one contextual element of a current context of the computing device.

11. The method of claim 1, further comprising:

receiving, by the computing system, an indication of a selection of a custom response, the custom response being a response that is different from each candidate response from the set of candidate responses; and responsive to receiving the indication of the selection, storing, by the computing system, at least an indication of the custom response.

12. A computing system, comprising:

at least one processor; and at least one memory storing instructions that, when executed by the at least one processor, cause the computing system to:

receive, from a computing device associated with a user, an indication of an incoming communication, the incoming communication including information;

determine, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users; and send, to the computing device, a set of candidate responses from the one or more candidate responses.

13. The computing system of claim 12, wherein the at least one memory further stores instructions that, when executed by the at least one processor, cause the computing system to:

receive a current location of the computing device, wherein determining the one or more candidate responses is further based at least in part on the current location.

14. The computing system of claim 12, wherein the at least one memory further stores instructions that, when executed by the at least one processor, cause the computing system to:

determine, based at least in part on calendar data associated with the user, that the user is currently busy; and responsive to determining that the user is currently busy, determine, based at least in part on the calendar data, a predicted time at which the user will be available, wherein determining the one or more candidate responses is further based at least in part on the predicted time at which the user will be available.

15. The computing system of claim 12, wherein the at least one memory further stores instructions that, when executed by the at least one processor, cause the computing system to:

receive an indication of a selection of a candidate response from the set of candidate responses; and responsive to receiving the indication of the selection, modify a frequency value indicating a frequency at which the candidate response was previously selected by at least one of the user and the one or more other users.

16. The computing system of claim 12, wherein the at least one memory further stores instructions that, when executed by the at least one processor, cause the computing system to:

determine a set of responses, wherein each response from the set of responses was previously selected, by at least one of the user and the one or more other users and at least at the threshold frequency, to respond to a respective incoming communication that includes at least a portion of the information included in the incoming communication;

determine a current context of the computing device, the current context including one or more contextual elements;

determine whether each response from the set of responses is associated with at least one contextual element from the one or more contextual elements; and responsive to determining that at least one response from the set of responses is associated with the at least one element, include the at least one response in the one or more candidate responses.

17. The computing system of claim 16, wherein at least one contextual element of the one or more contextual elements indicates at least one of: a mode of travel of the user, an activity in which the user is currently engaged, an availability of the user, a location of the user, a current time, an application that received the incoming communication, a type of incoming communication, a type of response, a format of incoming communication, a format of response, a sender of the incoming communication, a type of social relationship between the user and the sender, and a level of deference to the sender.

18. A non-transitory computer-readable storage medium encoded with instructions that, when executed, cause at least one processor of a computing system to:

receive, from a computing device associated with a user, an indication of an incoming communication, the incoming communication including information;

determine, based at least in part on the information included in the incoming communication, one or more candidate responses to the incoming communication, wherein each candidate response from the one or more candidate responses includes information to be sent by the computing device to at least one other computing device, and wherein at least one candidate response from the one or more candidate responses was previously selected at least at a threshold frequency by at least one of the user and one or more other users; and send, to the computing device, a set of candidate responses from the one or more candidate responses.

19. The computer-readable storage medium of claim 18, wherein the instructions that cause the at least one processor to determine the at least one candidate response comprise instructions that, when executed, cause the at least one processor to:

determine a set of responses, wherein each response from the set of responses was previously selected, by at least one of the user and the one or more other users and at least at the threshold frequency, to respond to a respective incoming communication that includes at least a portion of the information included in the incoming communication;

determine a current context of the computing device, the current context including one or more contextual elements and a respective weight for each contextual element from the one or more contextual elements, wherein at least one contextual element from the one or more contextual elements indicates at least one of: a mode of travel of the user, an activity in which the user is currently engaged, an availability of the user, a location of the user, a current time, an application that received the incoming communication, a type of incoming communication, a type of response, a format of incoming communication, a format of response, a sender of the incoming communication, a type of social relationship between the user and the sender, and a level of deference to the sender;

determine whether each response from the set of responses is associated with at least one contextual element from the one or more contextual elements;

responsive to determining that at least one response from the set of responses is associated with the at least one contextual element, determining, based at least in part upon the respective weight for each contextual element from the at least one contextual element, a respective score associated with the response; and determining the one or more candidate responses based at least in part on the respective score.

20. The computer-readable storage medium of claim 18, further encoded with instructions that, when executed, cause the at least one processor to:

determine, based at least in part one or more previous communications of the user, a level of deference to a sender of the incoming communication, wherein the one or more candidate responses are determined based at least in part on the level of deference.

* * * * *